Oct. 13, 1953 J. C. STANLEY 2,655,366
CHECKERWORK FOR HEAT REGENERATORS
Filed Jan. 11, 1950 2 Sheets-Sheet 1
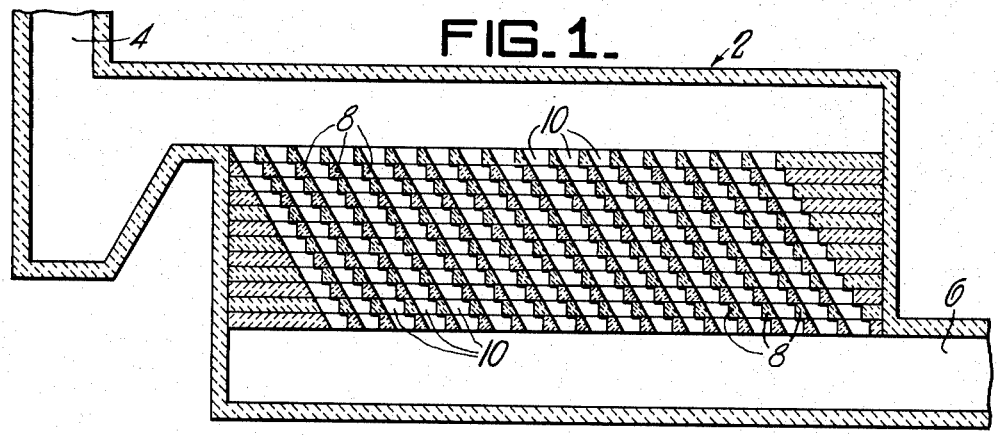
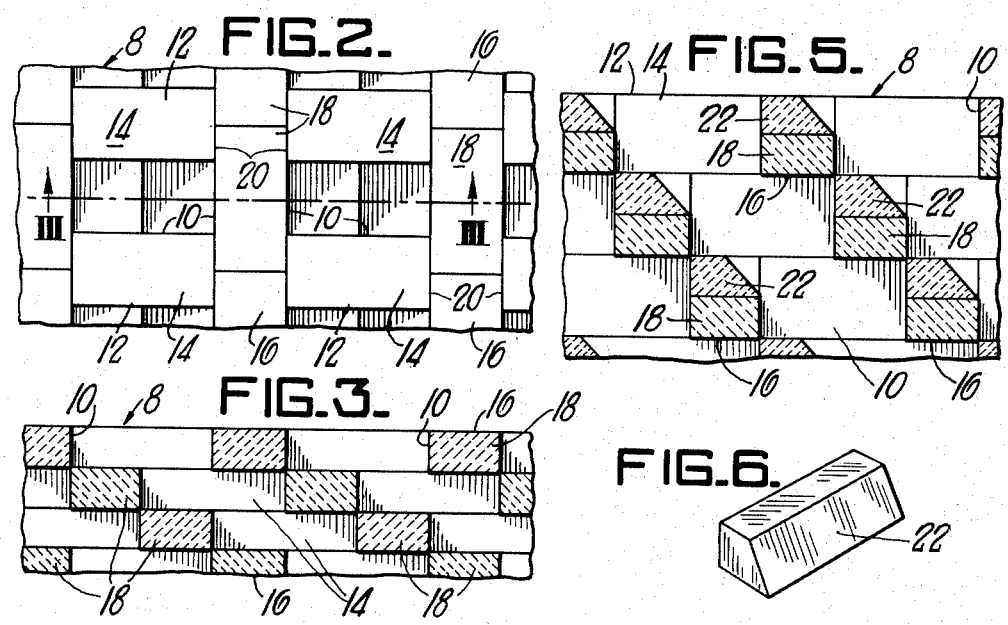
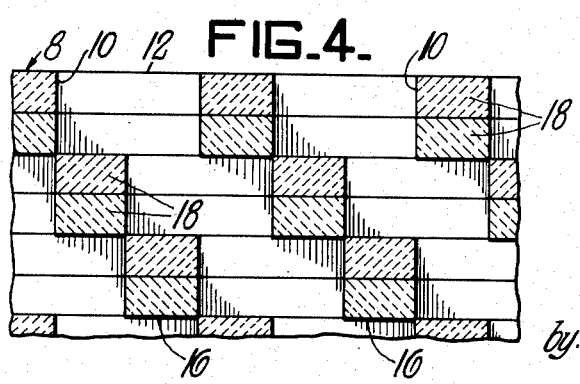
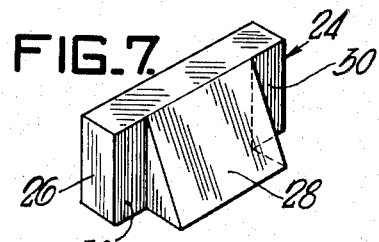
Inventor:
JOHN C. STANLEY,
by: Donald G. Dalton
his Attorney.

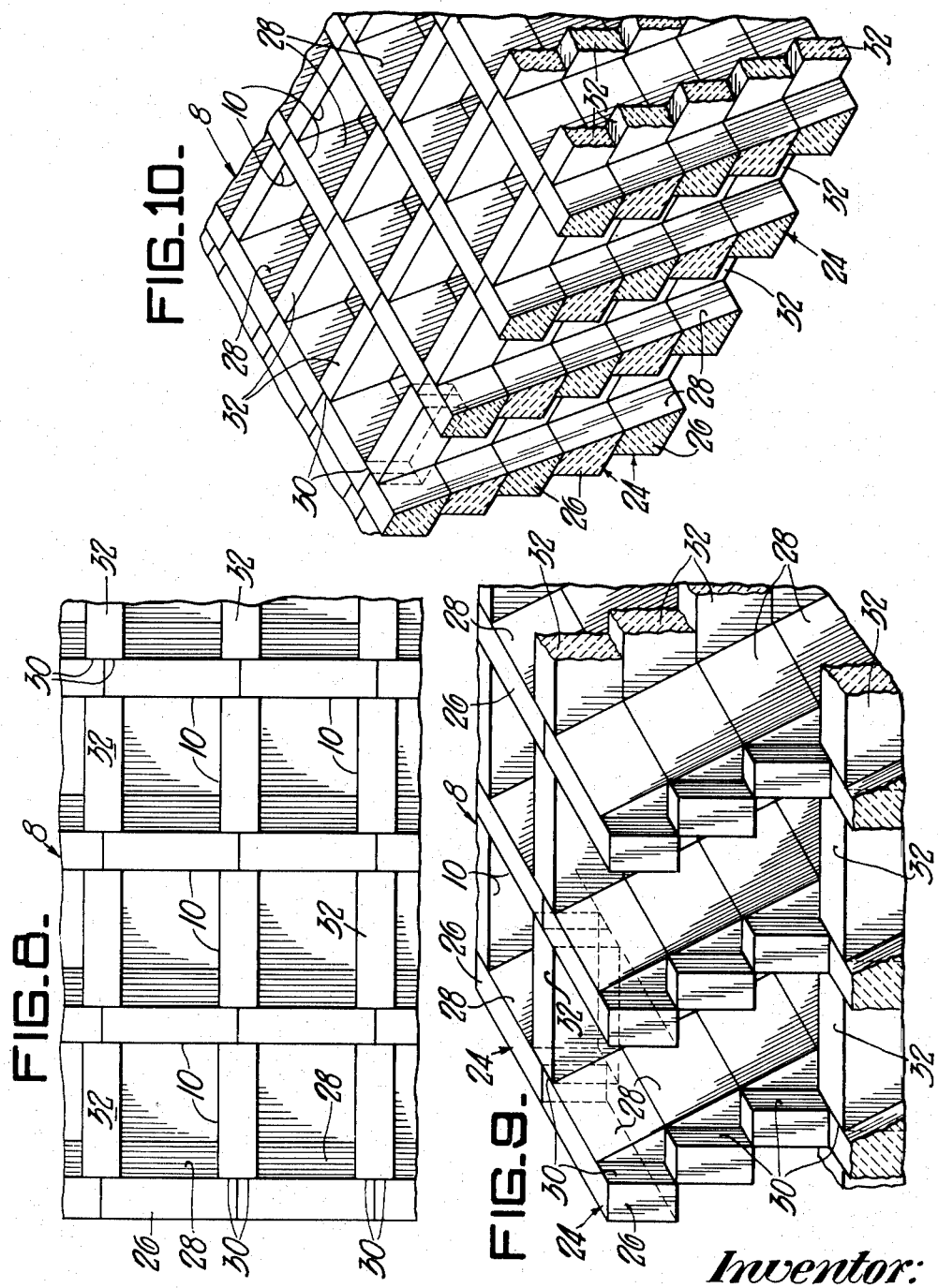

Patented Oct. 13, 1953

2,655,366

UNITED STATES PATENT OFFICE 2,655,366

CHECKERWORK FOR HEAT REGENERATORS

John C. Stanley, Duquesne, Pa., assignor to United States Steel Corporation, a corporation of New Jersey Application January 11, 1950, Serial No. 138,027

2 Claims. (Cl. 263—51)

This invention relates to checkerwork for heat regenerating devices and more particularly to checkerwork for the regenerators of an open hearth furnace.

These regenerators are generally rectangular arched chambers having vertical, parallel rider walls on the floor thereof which divide the chambers longitudinally into a number of flues. These walls are spanned by refractory tile which support the checkerwork which extends to a few feet below the base of the arch. One of the primary disadvantages of this design is the inefficient distribution of the gas stream which results therefrom. The hot gases tend to travel over the top of the checkers substantially to its end and are then pulled down through checkers by the stack draft. The cold air moves under the checkers through the flues well toward the furnace end before passing upwardly through the checkers. Thus, the efficiency of the checkers is greatly reduced. In order to overcome this deficiency, attempts have been made to redesign the regenerator so that the flues through the checkerwork are inclined at an angle to the vertical. However, the designs tried prior to my invention have brought about very little improvement in the situation. Any construction of checkerwork having inclined passageways and which is economically feasible has not provided closed passageways so that the gas passing through the flue does not all follow the desired path, but a large portion thereof leaks out through openings around the passageway and tends to travel in a vertical path.

I have proposed a brickwork for a heat regenerator which eliminates the above-described difficulties by providing an increase in the heat transfer area of the flues by constructing the same at an angle to the vertical and having the surface of one inclined end wall continuous and the surface of the opposite inclined wall constructed to present a serrated surface to the flow of the fluids. In this latter wall, the maximum area is exposed to the passing fluids, and as one long edge of the brick extends into the flow of the stream, a turbulence of desirable proportions is created, effecting an efficient heat transfer without impeding the flow of the fluids.

It is accordingly an object of my invention to provide a regenerator checkerwork in which the flues are closed passageways having a large heat transfer area and are inclined at an angle from the vertical.

Another object of my invention is to provide a brick which, when used in the construction of a heat regenerator checkerwork, forms inclined flues in the regenerator.

A further object of my invention is to provide a brick having an inclined face on one side and a shoulder portion on each side of the inclined face adapted to be used with standard shape brick to form a heat regenerator having inclined flues.

These and other objects will become more apparent after referring to the following specification and attached drawings, in which:

Figure 1 is a schematic view of a furnace regenerator having a checkerwork construction embodying my invention;

Figure 2 is a plan view showing a checkerwork of standard brick constructed according to the invention;

Figure 3 is a view taken on the line III—III of Figure 2;

Figure 4 is a sectional view showing a modification of Figure 3;

Figure 5 is a sectional view showing a checkerwork of standard brick and skewback brick constructed according to the invention;

Figure 6 is a perspective view of the skewback brick shown in Figure 5;

Figure 7 is a perspective view of the inclined face brick used in the checkerwork shown in Figures 8, 9 and 10;

Figure 8 is a plan view showing the checkerwork construction of the invention made with inclined face brick;

Figure 9 is an isometric view showing the checkerwork construction of the invention made with inclined face brick; and Figure 10 is a perspective view of the checkerwork shown in Figure 9.

Referring more particularly to the drawings, reference numeral 2 indicates an open hearth regenerator having a furnace uptake 4 at one end and a flue 6 at the other end leading to the smoke stack. The regenerator is provided with checkerwork 8 having inclined gas passageways 10 therethrough.

Figures 2 and 3 show the construction of the checkerwork 8, according to my invention, with the use of standard rectangular firebrick. Herein, one thickness of a standard rectangular firebrick is used for the formation of a single step of the flue. The side walls 12 of each of the gas passageways 10 are made up of bricks 14 arranged in horizontal courses with the bricks in each course being spaced apart and offset with respect to the bricks in the adjacent courses. The end walls 16 of the passageways are generally inclined and made up of bricks 18 which are positioned at right angles to the bricks 14 making up the side walls. Each of the bricks 18 has its ends extending into the spaces 20 between the bricks 14 in horizontal courses of adjacent side walls 12 and its bottom resting on the top of the bricks 14 in the next lower horizontal course. Thus, each brick 18 in the inclined end wall 16 contacts the brick 14 in the adjacent upper and lower courses and also contacts the brick 18 in the next upper and lower course.

Figure 4 offers a modification wherein the height of each step in the inclined end walls is made up of two thicknesses of standard firebrick. This arrangement provides an improvement by increasing the height of corresponding steps of the flues while keeping the length of tread equal to the width of conventional rectangular shape brick.

Figure 5 shows an arrangement wherein the inclined end walls of the flues are made more continuous by substituting a skewback brick 22 for the top brick 18 shown in Figure 4. The skewback brick here used has a base equal to the width of conventional rectangular bricks, a length equal to that of a standard brick and a top having a width equal to the thickness of standard rectangular brick. The use of the skewback brick on the standard brick permits a partial elimination of turbulence at one side of the flues while increasing the free cross section of them.

Figure 7 illustrates a brick 24 having a shape which has been found to be particularly suitable for application to my invention. The brick 24 presents a combination of a standard rectangular-shaped body portion 26 and a wedge-shaped, inclined face portion 28 adjoining a wide side of the rectangular body portion, leaving on both sides of it a shoulder 30 having a width of one-half of the thickness of the standard rectangular brick. Bricks 24 are used in checkerwork together with rectangular bricks of conventional design in the manner illustrated in Figures 8, 9 and 10. In this arrangement, the bricks 32 making up the side walls of the passageways 10 are standard rectangular firebrick arranged in horizontal courses on a narrow side, the bricks in each course being offset with respect to the bricks in the adjacent courses above and below. One end wall of each passageway is formed by the inclined face portions 28 of bricks 24 which are positioned at right angles to the side wall bricks 32. One end of the brick 32 in each course of side wall fits tightly into the space formed by the junction of the shoulders 30 of adjoining bricks 24. The other end abuts the junction of the body portions 26 of adjoining bricks 24 in the opposite end wall of the passageway.

The bricks 24 are laid in progressively offset courses so as to provide one unbroken continuous end wall in the passageway. As shown in Figures 8 and 10, the bricks in each succeeding course of end wall are laid with the bottom of their face portion 28 resting on the top of the body portion 26 of the bricks in the next lower adjacent course.

While several embodiments of my invention have been shown and described, it will be apparent that other adaptations and modifications may be made without departing from the scope of the following claims.

I claim:

1. A checkerwork construction for a regenerator comprising a plurality of closed parallel passageways extending through said regenerator at an angle to the vertical, said passageways each having opposed first and second smooth substantially continuous vertical walls, a third smooth substantially continuous wall inclined to the vertical and connecting said first and second walls, and a fourth wall opposed to said third wall and connecting said first and second walls, said fourth wall having a corbeled surface.

2. A checkerwork construction for a regenerator having a plurality of closed parallel passageways extending through said regenerator at an angle to the vertical which comprises a plurality of spaced vertical walls, each of said walls being composed of a plurality of courses of bricks, the bricks in each of said courses being horizontally aligned in spaced relation, said bricks being disposed so that the spaces between the bricks in each course are progressively offset from the top to the bottom of each vertical wall, and a plurality of substantially continuous spaced brick partitions extending transversely between said walls, the bricks forming said partitions each having a rectangular shaped body portion extending the full length of said brick, and a wedge shaped portion attached to one side of said body intermediate the length thereof so as to form a shoulder at each end of the body portion, each shoulder being adapted to fit into one of said spaces between adjacent bricks in said courses, said wedge shaped portion having a width equal to the distance between adjacent vertical walls and sloping from the top of said body portion downwardly and outwardly therefrom with its bottom being in the same plane as the bottom of said body portion.

JOHN C. STANLEY.

References Cited in the file of this patent

UNITED STATES PATENTS

| Number | Name | Date |
| --- | --- | --- |
| 111,691 | Siemens et al. | Feb. 7, 1871 |
| 1,500,455 | Hogbin et al. | July 8, 1924 |
| 1,706,270 | Wilcox | Mar. 19, 1929 |
| 1,895,302 | Wheeler et al. | Jan. 24, 1933 |
| 1,961,510 | Ryan | June 5, 1934 |
| 2,467,166 | Thorpe | Apr. 12, 1949 |

FOREIGN PATENTS

| Number | Country | Date |
| --- | --- | --- |
| 583,125 | Germany | Aug. 29, 1933 |